United States Patent [19]

Kaneko

[11] Patent Number: 4,949,343
[45] Date of Patent: Aug. 14, 1990

[54] ERROR DETECTING CIRCUIT FOR A DECODER

[75] Inventor: Hiroaki Kaneko, Tokyo, Japan
[73] Assignee: NEC Corporation, Japan
[21] Appl. No.: 298,369
[22] Filed: Jan. 18, 1989
[30] Foreign Application Priority Data
Jan. 18, 1988 [JP] Japan ................................. 63-8765
[51] Int. Cl.⁵ ............................................. G06F 11/00
[52] U.S. Cl. ..................................... 371/57.1; 371/52
[58] Field of Search ................. 371/57.1, 57.2, 52, 371/59, 48

[56] References Cited
U.S. PATENT DOCUMENTS
3,744,024  7/1973  Russell ................................. 371/52
4,320,512  3/1982  Richman .............................. 371/52
4,380,813  4/1983  Fogell ............................. 371/57.1 X Primary Examiner—Jerry Smith
Assistant Examiner—Robert W. Beausoliel
Attorney, Agent, or Firm—Laff, Whitesel, Conte & Saret

[57] ABSTRACT

There is disclosed an error detection circuit for a decoder which includes a plurality of circuit units connected in cascade, each of the circuit units having a first and a second input node, a selection input node connected to an associated one of output terminals of the decoder, and a first and a second output node, the first and second input nodes being connected respectively to the first and second output nodes, when the selection input node receives an active level, and the first output node being controlled to take a predetermined logic level and the second output node being controlled to take a logic level responsive to the logic level at the second input node when the selection input node receives an inactive level.

4 Claims, 4 Drawing Sheets

ERROR DETECTING CIRCUIT FOR A DECODER

BACKGROUND OF THE INVENTION

1. Field of the Invention:

The present invention relates to an error detecting circuit for a decoder having a plurality of output terminals and producing an active logic level at one output terminal in response to an input selection data.

2. Description of the Related Arts:

Such a decoder has been employed in a register selection circuit of a microprocessor or in a semiconductor memory as an address decoder. For example, the decoder employed in the register selection circuit has a plurality of output terminals connected respectively to read/write enable terminals of a plurality of registers and outputs the active level to one of the output terminals in response to the selection data applied thereto, thus selecting a corresponding one of the registers. Data is thereby written into or read from the selected register. However, if the decoder is faulty, the active logic level is outputted at two or more output terminals in response to a single selection data. The corresponding two or more registers are thereby selected simultaneously, so that the contents stored in these registers are outputted simultaneously or the same data is written into two or more registers simultaneously.

SUMMARY OF THE INVENTION

Therefore, an object of the present invention is to provide a decoder error detecting circuit for detecting whether or not a decode operates correctly.

Another object of the present invention is to provide an error detection circuit for a decoder to detect whether or not two or more output terminals of the decoder take the active logic level in response to the same selection data.

According to the present invention, there is provided an error detecting circuit for a decoder having a plurality of output terminals, comprising: a plurality of circuit units, each of which includes a first and a second input node, a selection input node connected to an associated one of the output terminals of the decoder, a first and a second output node, means for electrically connecting the first and second input nodes to the first and second output nodes, respectively, when the selection input node receives an active level from the associated output terminal of the decoder, and means for outputting a predetermined logic level to the first output node and for controlling a logic level of the second output in response to a logic level of the first input node when the selection input node receives an inactive level from the associated output terminal of the decoder, means for connecting the circuit units in series in such a manner that the first and second output nodes of the preceding circuit unit are connected respectively to the first and second input nodes of the subsequent circuit unit; means coupled to at least the second output node of the last circuit unit for producing an error detection signal when the predetermined logic level is outputted from the second output node of the last circuit unit.

If the decoder operates incorrectly to output the active level at two or more output terminals in response to a single selection data, the associated two or more circuit units receive the active level at the respective selection input nodes. The first one of those associated circuit units outputs the predetermined logic level at its first output node, so that the second one of them outputs the predetermined logic level at its second output node. As a result, the predetermined logic level is propagated at the second output node of the last circuit unit, and the error detection signal is produced to indicate an incorrect operation of the decoder.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
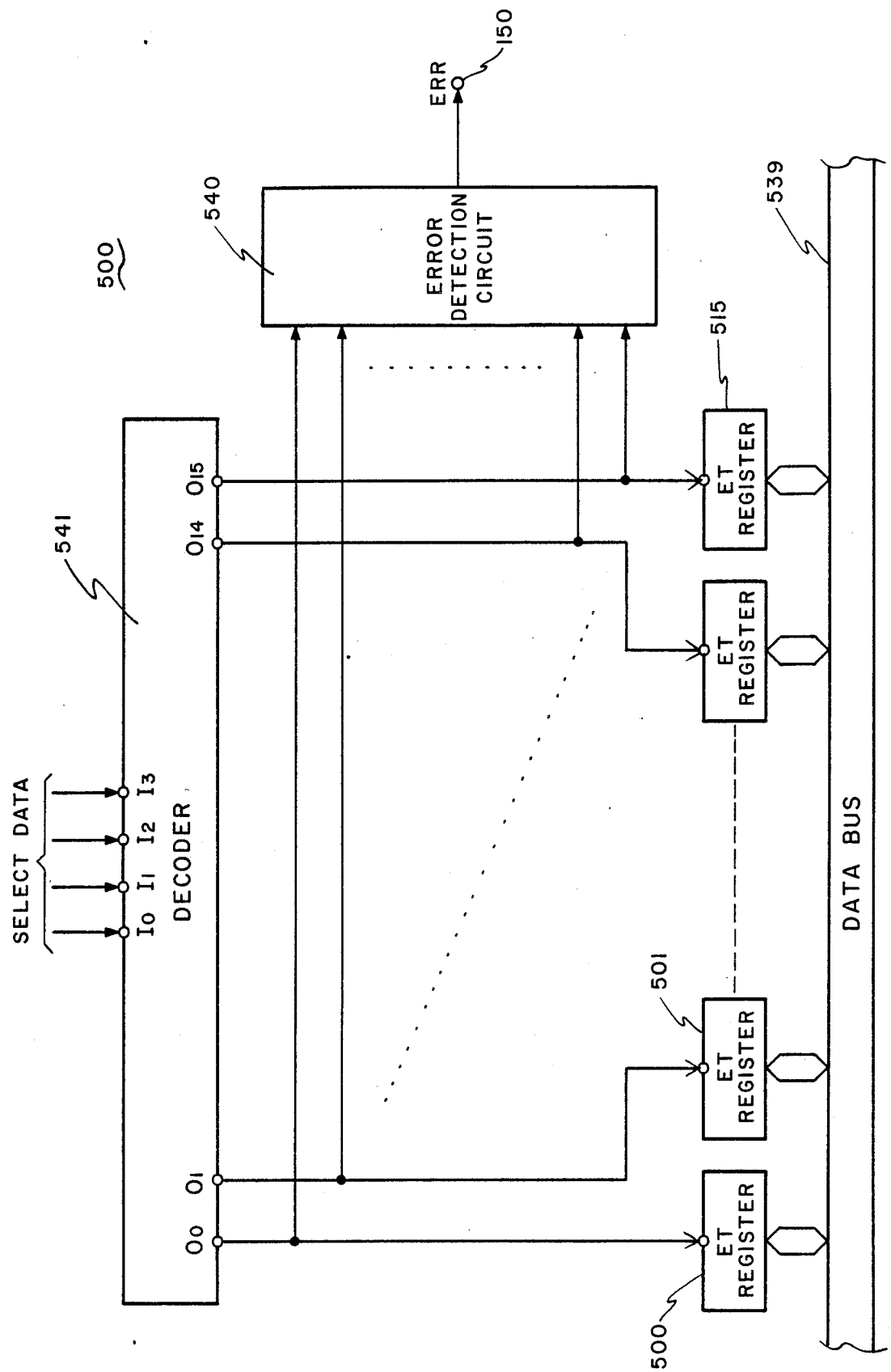
FIG. 1 is a block diagram showing a register selection circuit of a microprocessor as an example of application of an error detection circuit according to the present invention.

Referring to FIG. 1, a register selection circuit 500 includes a decoder 541 and sixteen registers 500 to 515. The decoder 541 has four input terminals $I_0$ to $I_3$ supplied with a 4-bits select data and sixteen output terminals $O_0$ to $O_{15}$ which are in turn connected to read-/write enable terminals ET of the registers 500 to 515, respectively. When the decoder 541 operates correctly, it output an active level (a high level or logic "1" in this description) at one of the output terminals $O_0$ to $O_{15}$ in response to the selection data, as shown in TABLE-1. The remaining output terminals are held at an inactive level (i.e., a low level or logic "0").

TABLE-1

| Selection Data | | | | Output Terminal |
|---|---|---|---|---|
| $I_0$ (LSB) | $I_1$ | $I_2$ | $I_3$ (MSB) | Taking Active Level |
| 0 | 0 | 0 | 0 | $O_0$ |
| 1 | 0 | 0 | 0 | $O_1$ |
| 0 | 1 | 0 | 0 | $O_2$ |
| 1 | 1 | 0 | 0 | $O_3$ |
| 0 | 0 | 1 | 0 | $O_4$ |
| 1 | 0 | 1 | 0 | $O_5$ |
| 0 | 1 | 1 | 0 | $O_6$ |
| 1 | 1 | 1 | 0 | $O_7$ |
| 0 | 0 | 0 | 1 | $O_8$ |
| 1 | 0 | 0 | 1 | $O_9$ |
| 0 | 1 | 0 | 1 | $O_{10}$ |
| 1 | 1 | 0 | 1 | $O_{11}$ |
| 0 | 0 | 1 | 1 | $O_{12}$ |
| 1 | 0 | 1 | 1 | $O_{13}$ |
| 0 | 1 | 1 | 1 | $O_{14}$ |
| 1 | 1 | 1 | 1 | $O_{15}$ |

By referring to TABLE-1, when the content of the selection data is "1000", for example, the second output terminal $O_1$ takes the active level. The register 501 is thereby selected and coupled to a data bus 539. Thus, the data stored in the register 501 is read onto the data bus 539 or the data on the bus 539 is written into the register 501.

However, if the decoder 541 fails or operates incorrectly, it outputs the active level at two or more output terminals thereof. For this reason, the corresponding two or more registers are selected and coupled to the data bus 539.

In order to detect whether or not the decoder 541 operates correctly, an error detection circuit 540 is provided in accordance with the present invention. This circuit 540 is connected to the output terminals $O_0$ to $O_{15}$ of the decoder 541 and produces at a terminal 150 an error signal ERR when at least two output terminals of the decoder 541 take the active level simultaneously.

Figure 2:
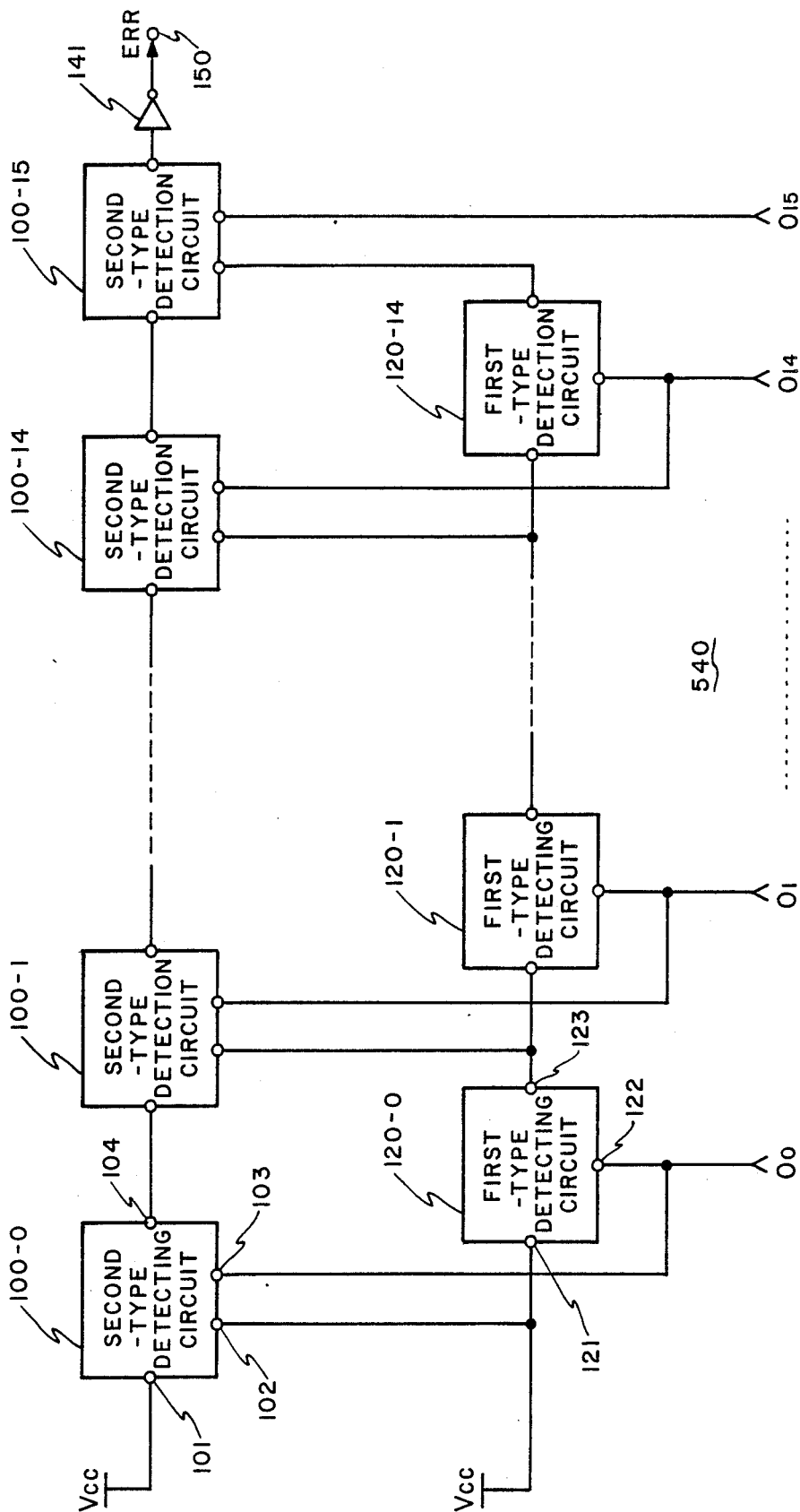
FIG. 2 is a block diagram showing an error detection circuit according to a first embodiment of the present invention.

Referring to FIG. 2, the error detection circuit 540 according to an embodiment of the present invention includes fifteen first-type detecting circuits 120-0 to 120-14 and sixteen second-type detecting circuits 100-0 to 100-15. Each of the first-type detecting circuits 120-0 to 120-14 has an input node 121, an output node 123 and a selection input node 122. The selection nodes 122 of the detecting circuit 120-0 to 120-14 are connected to the first to fifteen output terminals $O_0$ to $O_{14}$ of the decoder 541, respectively. The first-type detecting circuits 120-0 to 120-14 are connected in series such that the output node 123 of the preceding circuit is connected to the input node 121 of the subsequent circuit. When any one of the first-type detecting circuit 120-0 to 120-14 receives at its selection input node 122 the active level from the associated output terminal of the decoder 541, it produces the low level (logic "0") at its output node 123 irrespective of the logic level at its input node 121 to inform the subsequent detecting circuit 120 of receiving the active level from the decoder 541. On the other hand, the first-type detecting circuit or circuits 120 receiving the inactive level at the selection input node 122 transfer the logic level at the input node 121 to the output node 123. Since the detecting circuit 120-0 is the leading stage, the input node 121 thereof is fixed at logic "1" of Vcc level.

Each of the second-type detecting circuits 100-0 to 100-15 has first and second input nodes 101 and 102, an output node 104 and a selection input node 103. These second-type detecting circuits 100-0 to 100-15 are connected in series such that the output node 104 of the preceding circuit is connected to the first input node 101 of the subsequent circuit. The selection input nodes 102 of the second-type detecting circuits 100-0 to 100-15 are connected to the output terminals $O_0$ to $O_{15}$ of the decoder 541, respectively. The second input nodes 102 of the second-type detecting circuits 100-1 to 100-15 except the leading circuit 100-0 are connected to the output nodes 123 of the first-type detecting circuits 120-0 to 120-14, respectively. Since the detecting circuit 100-0 is the leading circuit, the first and second input nodes 101 and 102 thereof are connected to Vcc terminal to receive logic "1". When any of the second-type detecting circuit 100-0 to 100-15 receives at its selection input node 103 the active level from the associated output terminal of the decoder 541, it controls the logic level of its output node 104 in response to the logic level at its second input node 102. When the second input node 102 is at the high level (logic "1"), the output node 104 is controlled to be at the high level. In case where the second input node 102 is at the low level (logic "0"), the output node 104 is controlled to be at the low level. On the other hand, the second-type detecting circuit or circuits 100 receiving the inactive level at the selection node 103 from the decoder 541 transfer the logic level at the first input node 101 to the output node 104. An inverter 141 is connected between the error output terminal 150 and the final second-type detecting circuit 100-15. Therefore, the error detection signal ERR taking logic "1" indicates that the decoder 541 produces the active level at two or more output terminals simultaneously.

Next, description on the operation of the circuit shown in FIG. 2 will be made below. Assume first that the decoder 541 operates correctly to respond the selection data of "1000" to produce the active level only the second output terminal $O_1$ with holding the remaining output terminals $O_0$ and $O_2$ to $O_{15}$ at the inactive level. The detecting circuit 120-1 thereby outputs logic "0" at its output node 123, so that more significant detecting circuits 120-2 to 120-14 also produce logic "0" at the respective output nodes 123. Only the circuit 120-0 produce logic "1" at its output node 123. The detecting circuit 100-1 responds the active level of the output terminal $O_1$ to control its output node 104 in response to the logic level at its second input node 102. In this case, since logic "1" is applied thereto, the output node 103 of the circuit 100-1 takes logic "1". Since the output terminals $O_2$ to $O_{15}$ of the decoder 541 is at the inactive level, logic "1" at the output node 104 of the circuit 100-1 is transferred to the inverter 141 via the circuits 100-2 to 100-15. As a result, the signal ERR takes logic "0" to indicate the correct operation of the decoder 541.

On the other hand, if the decoder 541 operates incorrectly to produce the active level at two output terminals $O_1$ and $O_{14}$ in response to the selection data of "1000", the error detection signal ERR takes logic "1" to indicate the incorrect operation of the decoder 541. More specifically, in response to the active level of the second output terminal $O_1$, the output nodes 123 of the detecting circuit 120-1 to 120-14 all becomes to logic "0". Since the fifteenth output terminal $O_{14}$ is also at the active level, the detecting circuit 100-14 controls the logic level of its output node 104 in response to the logic level at its second input node 102. Since logic "0" is applied thereto, the output node 104 of the detecting circuit 100-14 becomes to logic "0". This logic level, logic "0", is transferred to the inverter 141 via the circuit 100-15. As a result, the signal ERR takes logic "1".

Thus, the error detection circuit 540 shown in FIG. 2 can be detect whether or not the decoder 541 operates correctly.

Figure 3B:
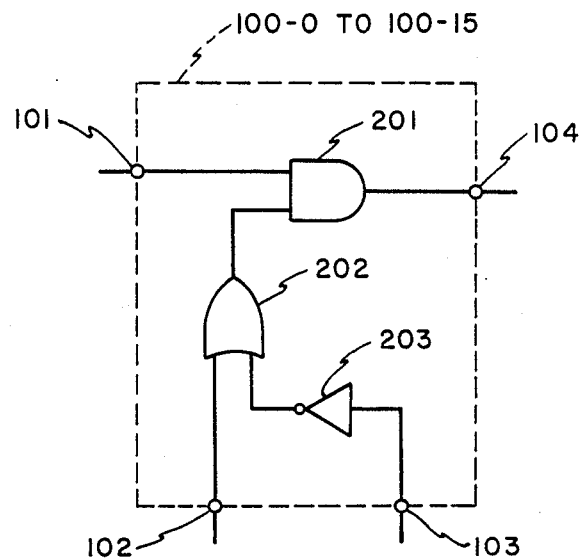
FIGS. 3A and 3B are gate circuit diagrams representing an example of first-type and second-type detection circuits shown in FIG. 2, respectively.
Figure 3A:
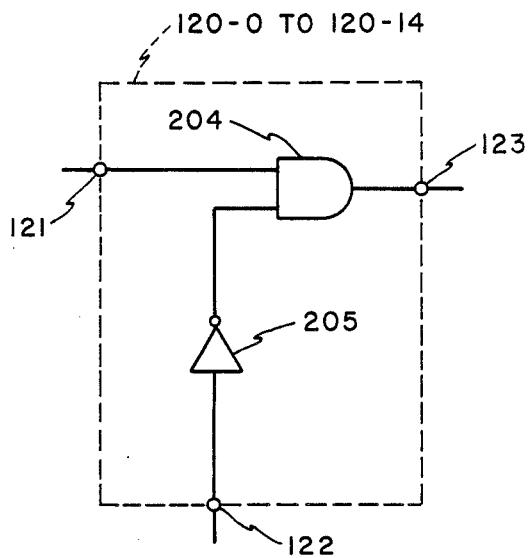

Each of the first-type detecting circuit 120-0 to 120-14 and the second-type detecting circuits 100-0 to 100-15 having the above-mentioned functions can be constituted by various static-type and/or dynamic-type gate circuits. One example of each of the first-type detecting circuits 120-0 to 120-15 is shown in FIG. 3A and one example of each of the first-type detecting circuits 100-0 to 100-15 is shown in FIG. 3B. Referring to FIG. 3A, each of the first-type detecting circuits 120-0 to 120-14 includes an AND gate 204 and an inverter 205 which are connected as shown. Accordingly, when the selection node 122 receives the active level (logic "1"), the output node 123 takes logic "0" irrespective of the level at the input node 121. On the other hand, when the selection node 122 receives the inactive level (logic "0"), the AND gate 204 is made open to transfer the logic level at the input node 121 to the output node 123. Referring to FIG. 3B, each of the second-type detecting circuits 100-0 to 100-15 includes an OR gate 202, an AND gate 201 and an inverter 203 which are connected as shown. Therefore, when the node 103 receives the active level, the output node 104 is controlled by the logic level at the second input node 102. In case where the node 104 receives the inactive level, on the other hand, the AND gate 201 is made open to transfer the logic level at the first input node 101 to the output node 104.

Figure 4:
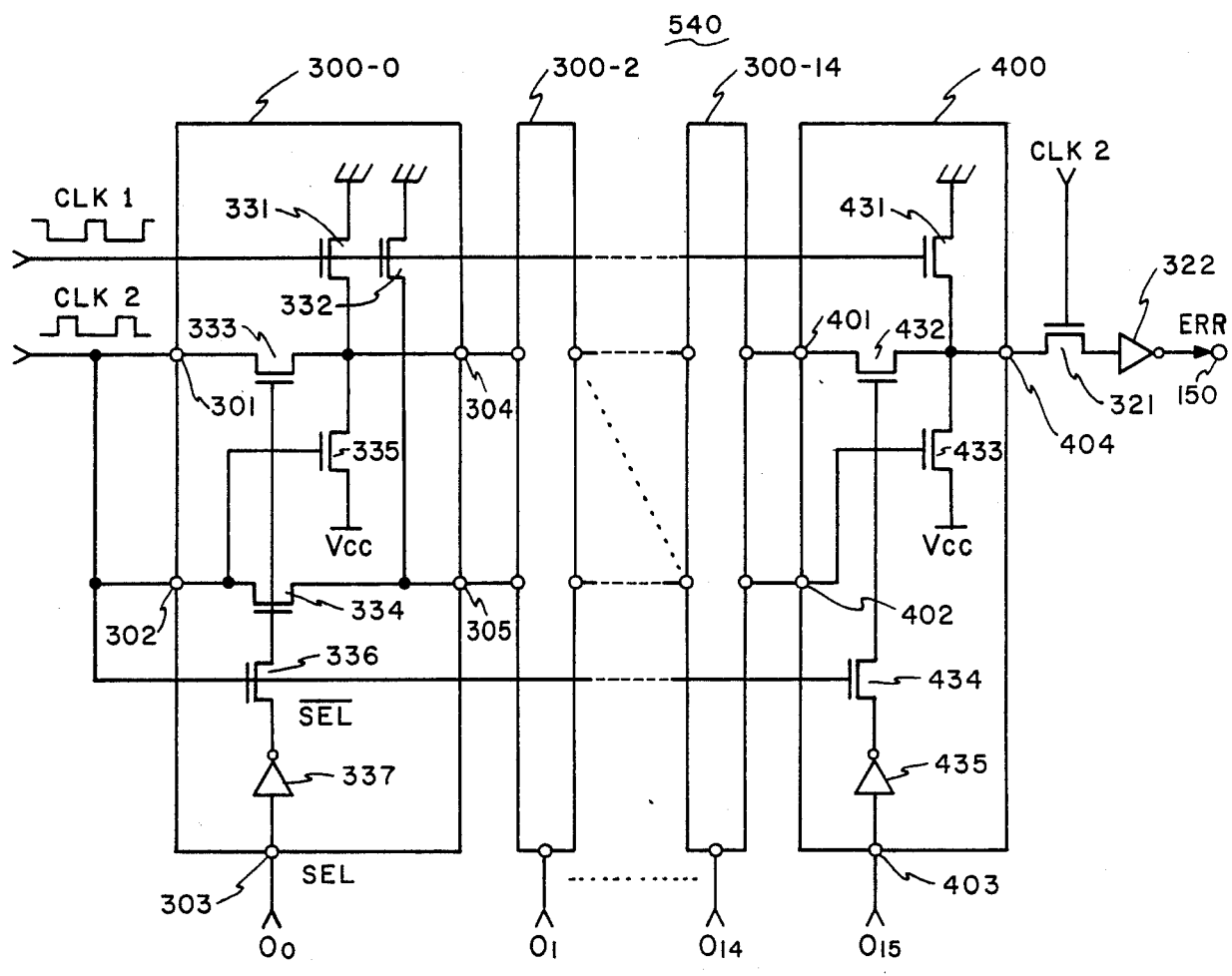
FIG. 4 is a circuit diagram showing an error detection circuit according to a second embodiment of the present invention.

Referring to FIG. 4, an error detection circuit 540' according to a second embodiment of the present invention includes fifteen first-type detecting units 300-0 to 300-14 and one second-type detecting unit 400. Each of the first-type detection units 300-0 to 300-14 includes first and second input nodes 301 and 302, a selection input node 303 and first and second output nodes 304 and 305. These units 300-0 to 300-14 are connected in series in such a manner that the first and output nodes 304 and 305 of the preceding unit are connected respectively to the first and second input nodes 301 and 302 of the subsequent unit. The selection nodes 303 of the units 300-0 to 300-14 are connected to the first to fifteenth output terminals $O_1$ to $O_{14}$ of the decoder 541, respectively. The second-type unit 400 includes first and second input nodes 401 and 402 connected respectively to the first and second output nodes 304 and 305 of the final first-type detecting unit 300-14, a selection input node 403 connected to the sixteenth output terminal $O_{15}$ of the decoder 541, and one output node 404 from which an error detection signal ERR is derived via a transistor 321, an inverter 322 and a terminal 150. Each of the first-type detecting unit 300-0 to 300-14 operates in a manner described below in response to the level applied to the node 303. More specifically, when the selection input node 303 receives the active level from the associated decoder output terminal O, logic "0" is produced at the second output node 305 and the logic level at the first output node 304 is controlled by the logic level at the second input node 302. When the second input node 302 is at logic "1", the first output node 304 takes logic "1". In case of logic "0" at the second input node 302, the first output node 304 takes logic "0". On the other hand, when the selection node 303 receives the inactive level, the first and second input nodes 301 and 302 are electrically connected to the first and second output nodes 304 and 305, respectively. The second-type detecting unit 400 responds to the active level at the selection node 403 to produce at the output node 404 logic "1" when the second input node 402 is at logic "1" and logic "0" when the second input node 402 is at logic "0". On the other hand, when the inactive level is supplied to the selection node 403, the first input node 401 is electrical connected to the output node 404.

In order to realize the above-mentioned operations of the detecting units 300-0 to 300-14 and 400 with decreasing the number of required circuit elements, a dynamic-type transistor circuit is employed for each unit. Since each of the first-type detecting units 300-0 to 300-14 has the same circuit construction, only the unit 300-0 is shown in detail. The first-type detecting unit 300 includes six N-channel MOS transistors 331 to 336 and one inverter 337. The transistor 333 is connected between the first input and output nodes 301 and 304 and the transistor 334 is connected between the second input and output nodes 302 and 305, the gates thereof are connected in common to the selection node 303 via the transistor 336 and the inverter 337. The transistor 336 operates as a sampling transistor responsive to a second clock signal CLK2 to transfer the inverted level of the logic level at the node 303 to the gates of the transistors 333 and 334 during the high level period of the clock signal CLK2. Accordingly, when the selection node 303 receives the inactive level, the transistors 333 and 334 are turned ON to connect the input nodes 301 and 302 to the output nodes 304 and 305, respectively. On the other hand, in case of the node 303 receiving the active level, the transistors 333 and 334 are turned OFF to disconnect the input nodes 301 and 302 from the output nodes 304 and 305. Thus, the transistors 333 and 334 operate as a level propagation control transistor. The transistors 331 and 332 operate as a precharging transistor responsive to a first clock signal CLK1 to precharge the output nodes 304 and 305 to the ground level, i.e. logic "0", during the high level period of the clock signal CLK1. As shown in FIG. 4, the first and second clock signals CLK1 and CLK2 are opposite in phase to each other. The transistor 335 operates as a output control transistor to control the first output node 304 in response to the level at the second input node 302 and thus is connected between the first output node 304 and Vcc terminal (i.e. logic "1" potential terminal), the gate thereof being connected to the second input node 302. The second-type detecting unit 400 includes four N-channel MOS transistors 431 to 434 and one inverter 435. The transistors 431, 432, 433 and 434 operate as the precharging transistor, the level propagation transistor, the output control transistor and the sampling transistor, respectively, as mentioned above, and thus are connected as shown. Since the unit 300-0 is the leading stage, the first and second input nodes 301 and 302 thereof are supplied with the second clock signal CLK2. The transistor 321 described above is also controlled by the second clock signal CLK2.

In a decoder testing node, the selection data supplied to the decoder 541 is allowed to change its content during the high level of the first clock signal CLK1, i.e. during the precharging period. At the end time point of the precharging period, all the input and output nodes of the units 300 and 400 are precharged to logic "0". When the second clock signal CLK2 changes to the high level, the levels at the output terminals $O_0$ to $O_{15}$ of the decoder 541 are sampled in the detecting units 300-0 to 300-14 and 400, respectively. Assume that the decoder 541 operates correctly to produce the active level at the first output terminal $O_0$ with maintaining the remaining output terminals $O_1$ to $O_{15}$ at the inactive level in response to the selection data of "0000". The transistors 333 and 334 of the detecting unit 300-0 are thereby turned OFF and the second output node 305 thereof is held at logic "0". Since the second input node 302 of the unit 300-0 is applied with logic "1" by the second clock signal CLK2, however, the transistor 305 is turned ON to change the first output node 304 to logic "1". This logic level is propagated through the remaining detecting units 300-1 to 300-14 and 400 and then transferred to the inverter 322 via the transistor 321 Thus, the signal ERR takes logic "0" to indicate no error operation of the decoder 541.

On the other hand, in case where the decoder 541 operates in correctly to produce the active level at two output terminals $O_0$ and $O_{15}$ in response to the selection data of "0000", logic, "1" is propagated through the first-type detection units 300-1 to 300-14 and then appears at the first output node 304 of the unit 300-14, but the transistor 432 of the unit 400 is in the nonconducting state to disconnect the output node 404 from the first input node 401 (i.e., the first output node 304 of the unit 300-14). At this time, the second input node 402 of the unit 400 is applied with logic "0". Therefore, the transistor 403 is maintained in the nonconducting state to hold the output node 404 at logic "0". The error detection signal ERR is thereby changed to logic "1" to indicate the incorrect operation of the decoder 541.

Thus, the error detection circuit 540' shown in FIG. 4 performs the same function as that shown in FIG. 2 with the reduced number of circuit element. Incidentally, each of the detecting units 300-0 to 300-14 is equivalent to each pair of first-type and second-type detecting circuits (100-0 and 120-0), . . . , (100-14 and 120-140), and the nodes 301, 302, 303, 304 and 305 of the unit 300 correspond to the nodes 101, 121, 103 (122), 104 and 123, respectively. In FIG. 4, the second-type detecting unit 400 can be replaced with the first-type detecting unit numbered by "300-15", and in that case the second output node 305 thereof is not employed.

Figure 5:
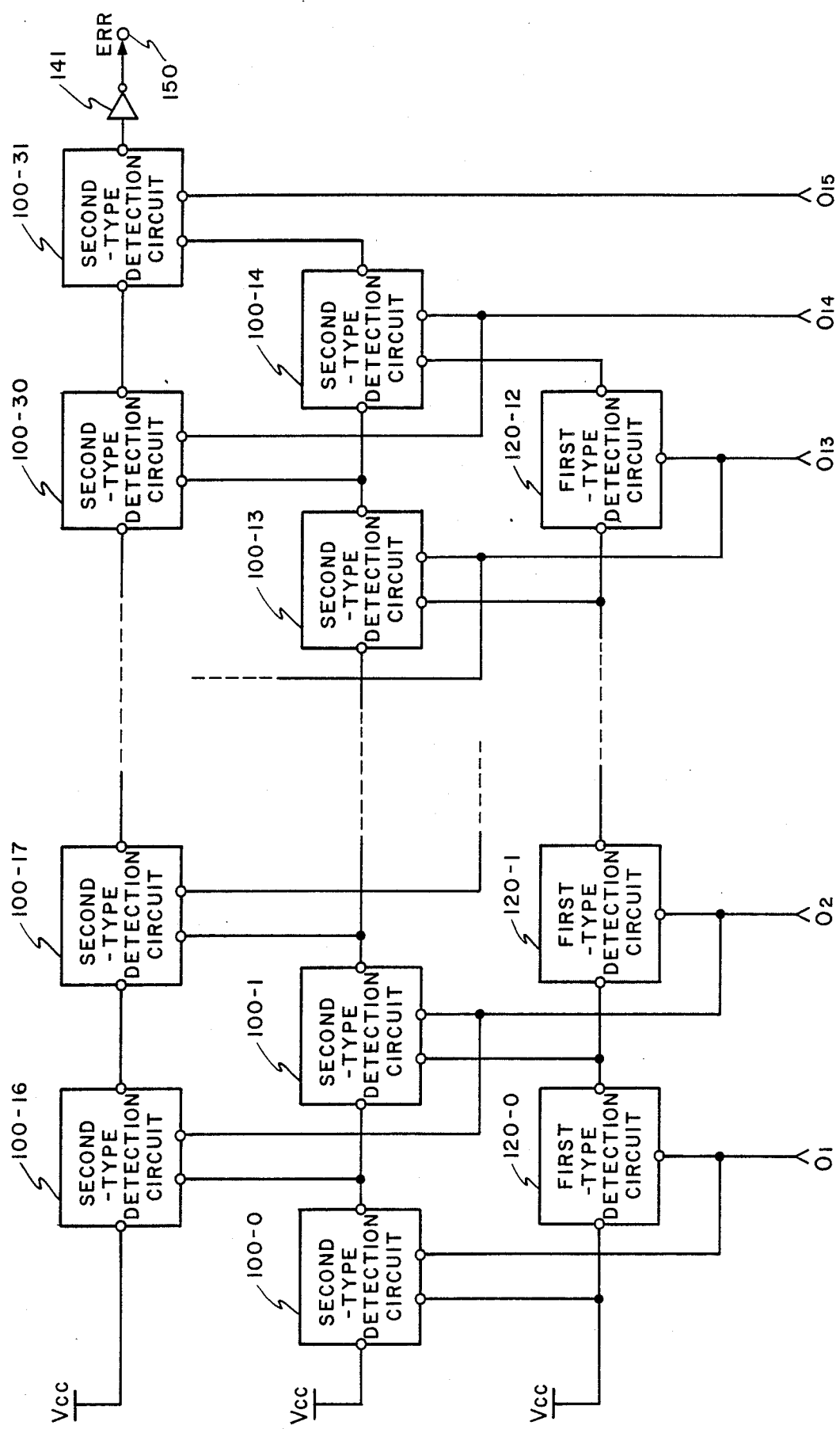
FIG. 5 is a block diagram representative of a third embodiment of the present invention.

Some decoders produces the active level at two output terminals in response to the same selection data. In this case, an error detection circuit is required to detect whether or not the decoder produces the active level at three or more output terminals simultaneously. Such an error detection circuit is shown in FIG. 5 as a third embodiment of the present invention, in which the same constituents as those shown in FIG. 1 are denoted by like reference numerals to omit the further description thereof. In FIG. 5, sixteen second-type detecting circuits 100-16 to 100-31 are additionally provided and connected as shown. The inverter 141 is connected between the error detection output terminal 150 and the additionally provided sixteenth second-type detecting circuit 100-31. Thus, the signal ERR takes the logic "1" when the active level appears at three or more of decoded output terminals $O_0$ to $O_{15}$. By further providing the second-type detecting circuits 100, it is possible to detect the decoder produces the active level at fourth or more output terminals.

This invention is not limited to the above-mentioned embodiments, but may be modified and changed without departing from the spirit and scope of the invention.

What is claimed is:

1. An error detection circuit for a decoder having a plurality of output terminals, said error detection circuit comprising:
   a plurality of circuit units, each including a first and a second input node, a selection input node connected to an associated one of said output terminals of said decoder, a first and a second output node, means for connecting said first and second input nodes to said first and second output nodes, respectively, when said selection input node receives an active level, and means for outputting a predetermined logic level to said first output node and for controlling a logic level of said second output node in response to the logic level at said second input node when said selection input node receives an inactive level;
   means for connecting said circuit units in cascade in such a manner that said first and second output nodes of the preceding circuit unit are connected respectively to said the first and second input nodes of the subsequent circuit unit;
   means coupled to at least said second output node of the last circuit unit for producing an error detection signal when said predetermined logic level is outputted from the second output node of said last circuit unit.

2. The error detection circuit as claimed in claim 1, wherein each of said circuit units further includes a first transistor connected between said first input and first output nodes, a second transistor connected between said second input and second output nodes, said first and second transistors gates being connected to said selection input node via a third transistor and an inverter, a fourth transistor connected between a reference potential and said first output node, a fifth transistor connected between said reference potential and said second output node, and a sixth transistor connected between a power potential and said first output node and having a gate connected to said second input node, gates of said fourth and fifth transistor being supplied with first clock signal, a gate of said third transistor being supplied with a second clock signal.

3. An error detection circuit for a decoder having a plurality of decoded output terminals, said error detection circuit comprising:
   a plurality of first circuit units, each including a first input node, a first selection input node, a first output node, means for connecting said first input node to said first output node when said first selection input node is at a first logic level, and means for outputting a predetermined logic level to said first output node when said first selection input node is at a second logic level;
   a plurality of second circuit units, each including a second input node, a third input node, a second selection input node, a second output node, means for connecting said second input node to said second output node when said second selection input node is at said first logic level, and means for controlling a logic level of said second output node in response to the logic level of said third input node when said second selection input node is at said second logic level;
   means for connecting said first circuit units in series such that the first output node of the preceding first circuit unit to the first input node of the subsequent first circuit unit;
   means for connecting said second circuit units in series such that the second output node of the preceding second circuit unit to the second input node of the subsequent second circuit unit;
   means for connecting the first output node of each of said first circuit units to the third input node of the associated one of said second circuit units;
   means for connecting said first and second selection input nodes of said first and second circuit units to the corresponding one of said decoded output terminals; and
   means for connecting the third input node of the leading one of said second circuit units to the first input node of the leading one of said first circuit units.

4. The error detection circuit as claimed in claim 3, wherein each of said first circuit units further includes a first AND circuit having a first input and connected to said first input node, a second input end connected via a first inverter to said first selection input node and an output end connected to said first output node, and each of said second circuit units further includes an OR circuit and a second AND circuit, said OR circuit having a first input end connected to said third input node and a second input end connected via a second inverter to said second selection input node, said second AND circuit having a first input end connected to said second input node, a second input end connected to an output end of said OR circuit and an output end connected to said second output node.

* * * * *